United States Patent
Sindhushayana et al.

(10) Patent No.: US 7,440,431 B2
(45) Date of Patent: *Oct. 21, 2008

(54) METHOD AND APPARATUS FOR ADAPTIVE RATE SELECTION IN A COMMUNICATION SYSTEM

(75) Inventors: Nagabhushana T. Sindhushayana, San Diego, CA (US); Eduardo A. S. Esteves, San Diego, CA (US); Rashid A. Attar, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

This patent is subject to a terminal disclaimer.

(21) Appl. No.: 10/834,605

(22) Filed: Apr. 28, 2004

(65) Prior Publication Data

US 2004/0202196 A1 Oct. 14, 2004

Related U.S. Application Data (63) Continuation of application No. 09/597,516, filed on Jun. 19, 2000, now Pat. No. 6,760,313.

(51) Int. Cl.
*H04Q 7/00* (2006.01)

(52) U.S. Cl. .................. 370/333; 370/252; 370/465

(58) Field of Classification Search ............ 370/252, 370/333, 465
See application file for complete search history.

(56) References Cited

U.S. PATENT DOCUMENTS

| 4,901,307 | A | 2/1990 | Gilhousen et al. |
| 5,101,501 | A | 3/1992 | Gilhousen et al. |
| 5,103,459 | A | 4/1992 | Gilhousen et al. |
| 5,504,773 | A | 4/1996 | Padovani et al. |
| 6,088,335 | A | 7/2000 | I et al. |
| 6,426,971 | B1 | 7/2002 | Wu et al. |
| 6,574,211 | B2 | 6/2003 | Padovani et al. |
| 6,662,322 | B1 * | 12/2003 | Abdelilah et al. ............ 714/708 |
| 7,054,407 | B1 * | 5/2006 | Li et al. ......................... 378/16 |

FOREIGN PATENT DOCUMENTS

EP 0848515 6/1998

* cited by examiner

*Primary Examiner*—Duc C Ho
(74) *Attorney, Agent, or Firm*—Howard H. Seo; Eric Ho; Thomas R. Rouse (57) ABSTRACT

A method and an apparatus for adaptive data rate selection in a high data rate (HDR) communication system are disclosed. An exemplary HDR communication system defines a set of data rates, at which an access point (AP) may transmit data packets to an access terminal (AT). The transmission data rate is selected to maintain target packet error rate (PER). Each AT monitors signal quality metric of signals received from APs. An AT receiving forward link signals from multiple ATs identifies the AT associated with the highest quality forward link signal.

18 Claims, 4 Drawing Sheets

METHOD AND APPARATUS FOR ADAPTIVE RATE SELECTION IN A COMMUNICATION SYSTEM

CLAIM OF PRIORITY UNDER 35 U.S.C. §120

The present application for patent is a Continuation and claims priority to patent application Ser. No. 09/597,516 entitled "METHOD AND APPARATUS FOR ADAPTIVE RATE SELECTION IN A COMMUNICATION SYSTEM" filed Jun. 19, 2000, now U.S. Pat. No. 6,760,313, issued on Jul. 6, 2004 Sindhushayana et al., and assigned to the assignee hereof and hereby expressly incorporated by reference herein.

BACKGROUND

1. Field

The current invention relates to communication. More particularly, the present invention relates to a novel method and apparatus for adaptive rate selection in a wireless communication system.

2. Background

A modern communications system is required to support a variety of applications. One such communications system is a code division multiple access (CDMA) system that conforms to the "TIA/EIA/IS-95 Mobile Station-Base Station Compatibility Standard for Dual-Mode Wide-Band Spread Spectrum Cellular System," hereinafter referred to as the IS-95 standard. The CDMA system supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

In a CDMA system, communications between users are conducted through one or more base stations. In wireless communication systems, forward link refers to the channel through which signals travel from a base station to a subscriber station, and reverse link refers to channel through which signals travel from a subscriber station to a base station. By transmitting data on a reverse link to a base station, a first user on one subscriber station may communicate with a second user on a second subscriber station. The base station receives the data from the first subscriber station and routes the data to a base station serving the second subscriber station. Depending on the location of the subscriber stations, both may be served by a single base station or multiple base stations. In any case, the base station serving the second subscriber station sends the data on the forward link. Instead of communicating with a second subscriber station, a subscriber station may also communicate with a wireline telephone through a public switched telephone network (PSTN) coupled to the base station, or a terrestrial Internet through a connection with a serving base station.

Given the growing demand for wireless data applications, the need for very efficient wireless data communication systems has become increasingly significant. The IS-95 standard specifies transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the traffic data or voice data is partitioned into code channel frames that are 20 milliseconds wide with data rates as high as 14.4 Kbps.

In mobile radio communication systems, there are significant differences between the requirements for providing voice and data services (i.e., non-voice services such as Internet or fax transmissions). Unlike data services, voice services require stringent and fixed delays between speech frames. Typically, the overall one-way delay of speech frames used for transmitting voice information must be less than 100 msec. By contrast, transmission delays that occur during data (i.e., non-voice information) services can vary and larger delays then those that can be tolerated for voice services can be utilized.

Another significant difference between voice and data services is that, in contrast to data services, voice services require a fixed and common grade of service. Typically, for digital systems providing voice services, this requirement is met by using a fixed and equal transmission rate for all users and a maximum tolerable error rate for speech frames. For data services, the grade of service can vary from user to user.

Yet another difference between voice services and data services is that voice services require a reliable communication link which, in the case of a CDMA communication system, is provided using a soft handoff. A soft handoff requires the redundant transmission of the same voice information from two or more base stations to improve reliability. A soft handoff method is disclosed in U.S. Pat. No. 5,101,501, entitled "SOFT HANDOFF IN A CDMA CELLULAR TELEPHONE SYSTEM." This additional reliability is not required to support data services, because data packets received in error can be retransmitted.

As a mobile station moves in a mobile radio communication system, the quality of the forward link (and the capacity of the forward link to transmit data) will vary. Thus, at some moments a given forward link between a base station and a mobile station will be able to support a very high data transmission and, at other moments, the same forward link may only be able to support a much reduced data transmission rate. In order to maximize the throughput of information on the forward link, it would be desirable if the transmission of data on the forward link could be varied so as to increase the data rate during those intervals where the forward link can support a higher transmission rate.

When non-voice traffic is being sent from a base station to a mobile station on a forward link, it may be necessary to send control information from the mobile station to the base station. At times, however, even though the forward link signal may be strong, the reverse link signal may be weak, thereby resulting in a situation where the base station cannot receive control information from the mobile station. In such situations, where the forward link and the reverse link are unbalanced, it may be undesirable to increase the transmit power on the reverse link in order to improve the reception quality of the control information at the base station. For example, in CDMA systems, increasing the transmit power on the reverse link would be undesirable, as such a power increase could adversely affect the reverse link capacity seen by other mobile stations in the system. It would be desirable to have a data transmission system where the forward and reverse links associated with each mobile station were maintained in a balanced state without adversely impacting the reverse link capacity. It would be further desirable if such a system could maximize the throughput of non-voice data on individual forward links when such links are sufficiently strong to support higher data rates.

One approach to the aforementioned requirements in high data rate (HDR) systems is to keep the transmit power fixed and vary the data rate depending on the users' channel conditions. Consequently, in a modern HDR system, Access Point(s) (APs) always transmit at maximum power to only one Access Terminal (AT) in each time slot, and the AP uses rate control to adjust the maximum rate that the AT can reliably receive. An AP is a terminal allowing high data rate transmission to ATs.

As used in this document, a time slot is a time interval of finite length, e.g., 1.66 ms. A time slot can contain one or more packets. A packet is a structure, comprising a preamble, a payload, and a quality metric, e.g., a cyclical redundancy check (CRC), a parity bit, and the like. The preamble is used by an AT to determine whether a packet has been intended for the AT.

An exemplary HDR system defines a set of data rates, ranging from 38.4 kbps to 2.4 Mbps, at which an AP may send data packets to an AT. Such a system is disclosed in application Ser. No. 08/963,386, entitled "METHOD AND APPARATUS FOR HIGH RATE PACKET DATA TRANSMISSION," filed Nov. 3, 1997, now U.S. Pat. No. 6,574,211, issued Jun. 3, 2003 to Padovani et al., assigned to the assignee of the present invention and incorporated by reference herein. The data rate is selected to maintain a targeted packet error rate (PER). The AT measures the received signal to interference and noise ratio (SINR) at regular intervals, and uses the information to predict an average SINR over the next packet duration. An exemplary prediction method is disclosed in application Ser. No. 09/394,980 entitled "SYSTEM AND METHOD FOR ACCURATELY PREDICTING SIGNAL TO INTERFERENCE AND NOISE RATIO TO IMPROVE COMMUNICATIONS SYSTEM PERFORMANCE," filed Sep. 13, 1999, now U.S. Pat. No. 6,426,971, issued Jul. 30, 2002 to Wu et al., assigned to the assignee of the present invention and incorporated herein by reference.

Figure 1:
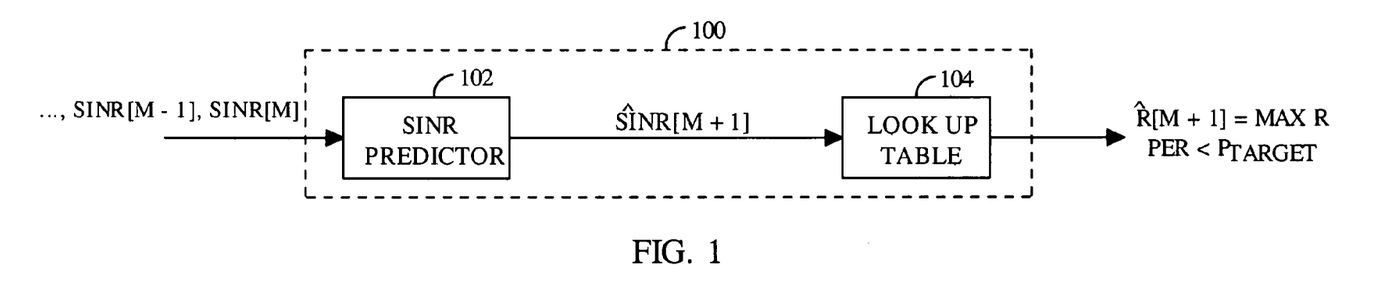
FIG. 1 illustrates a block diagram of a conventional, open-loop rate-control apparatus.

FIG. 1 shows an exemplary embodiment of an open-loop rate control apparatus 100. A stream of past SINR values at instances [n-m], . . . [n-1], [n], each measured over a duration of a corresponding packet, is provided to a predictor 102. The predictor 102 predicts the average SINR over the next packet duration in accordance with the following equation:

$$OL\_SINR_{Predicted} = OL\_SINR_{Estimated} - K \cdot \sigma_e \quad (1)$$

In Equation (1), $OL\_SINR_{Predicted}$ is an SINR predicted by the open-loop for next packet, $OL\_SINR_{Estimated}$ is an SINR estimated by the open-loop based on past SINR values, K is a back-off factor, and $\sigma_e$ is a standard deviation of an error metric.

The estimated SINR may be obtained by selecting an output from a bank of low pass filters (not shown) acting on past measurements of SINR. Selection of a particular filter from the filter bank may be based on an error metric, defined as a difference between the particular filter output and measured SINR over a packet duration immediately following the output. The predicted SINR is obtained by backing off from the filter output by an amount equal to the product of the back-off factor K and the standard deviation $\sigma_e$ of the error metric. The value of the back-off factor K is determined by a back-off control loop, which ensures that a tail probability, i.e., probability that predicted SINR exceeds the measured SINR, is achieved for a certain percentage of time.

The $SINR_{Predicted}$ value is provided to a look up table 104 that maintains a set of SINR thresholds. The SINR thresholds represent the minimum SINR required to decode a packet at each data rate with 1% PER. An AT (not shown) uses the look up 104 to select the highest data rate whose SINR threshold is below the predicted SINR, and requests that an AP (not shown) send the next packet at this data rate.

The aforementioned method is an example of an open-loop rate control method that determines the best rate at which to receive the next packet, based only on the measurement of the channel SINR, without any information about the demodulator error rate (for packets of each data rate) at a given SINR under the prevailing channel conditions. Any open-loop rate control algorithm suffers from several shortcomings, some of which are discussed below. First, a certain tail probability, e.g., 2%, does not imply a PER of 2%. This is because PER is a monotonically decreasing function of SINR, with a finite slope that depends on the coding scheme and channel conditions. However, Equation (1) assumes "brick wall" PER characteristics, i.e., a packet is deemed to be decoded whenever the SINR exceeds the threshold for the corresponding rate, and a packet is declared to be in error whenever the SINR falls below the threshold. Furthermore, the open-loop rate control method uses a fixed set of SINR thresholds, which ensures PERs close to the target error rate under worst-case channel conditions. However, the performance of the demodulator depends not only on the SINR, but also on channel conditions. In other words, a method that uses a fixed set of SINR thresholds for all channels achieves different PERs on different channels. Consequently, while the open-loop method works optimally under the worst-case channel conditions, it is possible that under typical channel conditions, the method results in much lower error rates than is necessary, at the expense of diminished throughput. Additionally, a practical rate control method necessitates a small, finite set of data rates. The rate selection method always selects the nearest lower data rate in order to guarantee an acceptable PER. Thus, rate quantization results in loss of system throughput.

Therefore, there exists a need to address deficiencies of the existing method.

SUMMARY

The present invention is directed to a novel method and apparatus for adaptive rate selection in a wireless communication system. It is one aspect of the invention to improve throughput of a high data rate wireless communication system by taking advantage of a margin between an SINR threshold required to receive a requested rate correctly and an SINR estimate. This goal is advantageously achieved by identifying two data rates and selecting frequency of transmission of each of them to achieve a target PER. It is another aspect of the invention to extend the method to N rates.

It is yet another aspect of the invention to further improve the throughput by updating parameters used for the data rate selection to more accurately reflect the predicted SINR value.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 2:
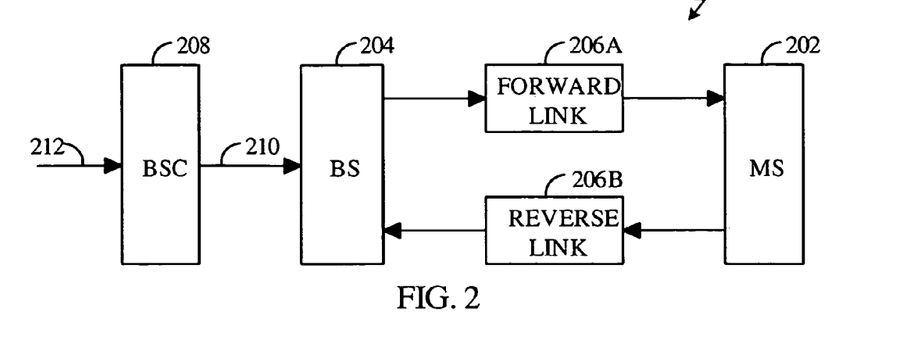
FIG. 2 illustrates a block diagram of an exemplary communication system capable of implementing embodiments of the invention.

FIG. 2 illustrates an exemplary communication system 200 capable of implementing embodiments of the invention. An AT 202 transmits signals to an AP 204 over a reverse link 206b, and receives signals from the AT 204 over a forward link 206a. The communication system 200 can be operated bi-directionally, each of the terminals 202, 204 operating as a transmitter unit or a receiver unit, or both concurrently, depending on whether data is being transmitted from, or received at, the respective terminal 202, 204. In a cellular wireless communication system embodiment, the AP 204 can be a base station (BS), the AT 202 can be a mobile station (MS), and the forward link 206a and reverse link 206b can be electromagnetic spectra. For simplicity, communication system 200 is shown to include one BS 204 and one MS 202 only. However, other variations and configurations of the communication system 200 are possible. For example, in a multi-user, multiple access communication system, a single BS may be used to concurrently transmit data to a number of MSs. In addition, in a manner similar to soft-handoff, disclosed in U.S. Pat. No. 5,101,501, entitled "SOFT HANDOFF IN A CDMA CELLULAR TELEPHONE SYSTEM," assigned to the assignee of the present application and incorporated by reference herein, an MS may concurrently receive transmissions from a number of BSs. The communication system of the embodiments described herein may include any number of BSs and MSs. Consequently, each of the multiple BSs is connected to a base station controller (BSC) 208 through a backhaul similar to backhaul 210. The backhaul 210 can be implemented in a number of connection types including, e.g., a microwave or wire-line E1 or T1, or optical fiber. A connection 212 connects the wireless communication system 200 to a public switched data network (PSDN), which is not shown.

In one embodiment, each MS monitors signal quality metric of signals received from BSs. An MS (for example MS 202) receiving forward link signals from multiple BSs identifies the BS associated with the highest quality forward link signal (for example BS 204). The MS 202 then evaluates a rate at which a tail probability of error is greater than or equal to a target tail probability of error. The tail probability of error is the probability that the actual signal quality during the packet transmission period is less than the signal quality required for decoding a packet correctly at a given rate. An exemplary embodiment uses tail probability of error of approximately 10%. In one embodiment, the rate is computed in accordance with principles disclosed in reference to FIG. 1. The MS 202 then generates a prediction of a maximum data rate $R_i$ at which a PER of packets received from the identified BS 204 will not exceed a target PER. An exemplary embodiment uses target PER of approximately 10%. The MS 202 then generates a prediction of a data rate $R_{i+1}$, higher than $R_i$, at which the PER of packets received from the selected BS 204 will exceed the target PER. The MS 202 uses the values $R_i$, $R_{i+1}$ in an adaptive rate selection method, discussed in detail in reference to FIG. 3 below, which predicts probabilities $\alpha_i, \alpha_{i+1}$ of selecting data rates $R_i, R_{i+1}$, such that the target PER is achieved. The adaptive rate selection method uses the probabilities $\alpha_i, \alpha_{i+1}$ as biases for actual selection of data rates $R_i, R_{i+1}$. One embodiment of the selection method uses a random number generator, which generates numbers from the interval (0,1), inclusive. A bias threshold ($TH_{BIAS}$) is defined by the following equation:

$$TH_{BIAS} = \frac{\alpha_i}{\alpha_{i+1}} \qquad (2)$$

When the random number falls within the interval $(0, TH_{BIAS})$ the data rate $R_i$ is selected, and when the random number falls within the interval $(TH_{BIAS}, 1)$ the data rate $R_{i+1}$ is selected.

The MS 202 then sends a message over the reverse link 206b, requesting the actually selected rate. In one embodiment of the invention, the message is sent on a data rate control channel (DRC). The use of a DRC is disclosed in the above-mentioned application Ser. No. 08/963,386, now U.S. Pat. No. 6,574,211.

In one embodiment, the BS 204 monitors the reverse channel from one or more MSs and transmits data on the forward link 206a to no more than one destination MS during each forward link transmit time slot. The BS 204 selects a destination MS (for example MS 202) based on a scheduling procedure designed to balance the grade of service (GoS) requirements of each MS with the desire to maximize throughput of the system 200. In an exemplary embodiment, the BS 204 transmits data to the destination MS 202 only at the rate indicated by the most recent message received from the destination MS. This restriction makes it unnecessary for the destination MS 202 to perform rate detection on the forward link signal. The MS 202 need only determine whether it is the intended destination MS during a given time slot.

In an exemplary embodiment, BSs transmit a preamble within the first time slot of each new forward link packet. The preamble identifies the intended destination MS. Once a destination MS establishes that it is the intended destination for data in a slot, the MS begins decoding the data in the associated time slot. In an exemplary embodiment, the destination MS 202 determines the data rate of the data in the forward link based on the request message the MS 202 sent. The number of forward link time slots used to transmit a packet varies based on the data rate at which the packet is sent. Packets sent at a lower rate are sent using a greater number of time slots.

Once the MS 202 determines that the data are intended for the MS 202, the method is repeated.

Although the aforementioned method was described in reference to two data rates $R_i$, $R_{i+1}$, one skilled in the art will appreciate that the method may be extended to N rates, as will be described below.

I. Adaptive Rate Selection Method Using Two Rates

Figure 3:
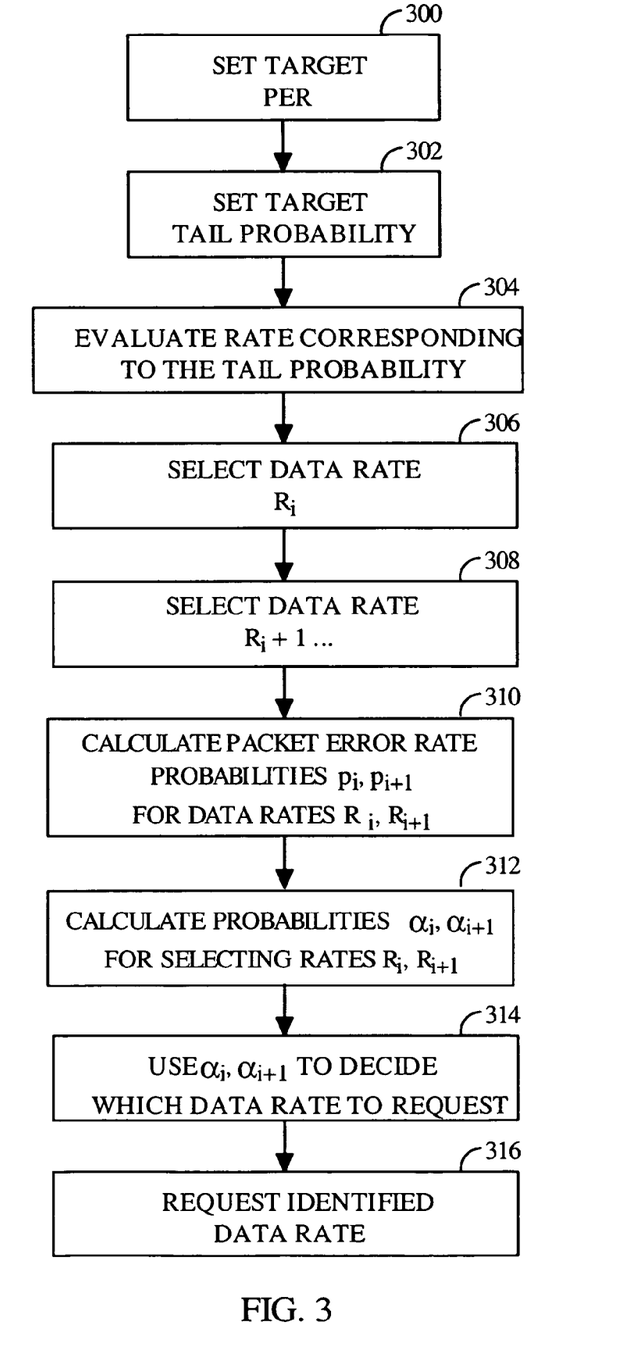
FIG. 3 illustrates a flowchart of an exemplary method of selecting a rate in a communication system.

FIG. 3 illustrates a flowchart of an exemplary adaptive rate selection method, which ensures the best possible throughput with acceptable error rates in a communication system, utilizing two rates.

In step 300, a desired PER is set. The desired PER may advantageously be a parameter established by a system operator. In one embodiment, the desired PER is set to 10%. Control flow then proceeds to step 302.

In step 302, a target tail probability of error is set. The target tail probability of error is set to a value, advantageously approximating the value of desired PER. In one embodiment, the target tail probability of error is set to 10%. Control flow then proceeds to step 304.

In step 304, a rate at which a tail probability of error is greater than or equal to a target tail probability of error is evaluated. In one embodiment, the rate may be determined from a probability density function, which represents a probability of an error with which a packet transmitted at a certain rate will be received. Control flow then proceeds to step 306.

In step 306, a data rate $R_i$ at which a PER of packets received over a forward link will not exceed the target PER is selected. In one embodiment, $R_i$ is a data rate, an SINR threshold for correct detection of which is lower than and adjacent to a predicted SINR for a given tail probability of error. In another embodiment, $R_i$ is any data rate, an SINR threshold for correct detection of which is lower than the predicted SINR for a given tail probability of error. Control flow then proceeds to step 308.

In step 308, a data rate $R_{i+1}$ at which a PER of packets received over a forward link will exceed the target PER is selected. In one embodiment, $R_{i+1}$ is any data rate, an SINR threshold for correct detection of which is higher than and adjacent to the predicted SINR for a given tail probability. In another embodiment, $R_{i+1}$, is a data rate, an SINR threshold for correct detection of which is higher than the predicted SINR for a given tail probability of error. Control flow then proceeds to step 310.

In step 310, PER probabilities $p_i$, $p_{i+1}$ for a set of data rates $R_i$, $R_{i+1}$ are calculated. The PER probability for the ith rate $p_i$ is defined by the following equation:

$$p_i \equiv P(R_i\_in\_error) \tag{2a}$$

in which P denotes a probability that a packet with a data rate $R_i$ was received in error ($R_i\_in\_error$).

The PER probabilities $p_i$, $p_{i+1}$ are advantageously updated using a true packet event or, when a true packet event is not available, a fast-track method.

A true packet event occurs when, upon request from an MS for a packet at a certain rate, the MS detects a preamble and either correctly or incorrectly decodes the packet. The packet is correctly decoded if the packet's quality metric, determined from the received packet, matches a quality metric contained in the packet. The quality metric may be, e.g., a cyclic redundancy check, a parity bit, and other metric known to those skilled in the art. In an exemplary embodiment, the quality metric is a CRC. Otherwise, the packet is declared incorrectly decoded, i.e., the packet is in error.

A true packet event is not available when, upon request from an MS for a packet at a certain rate, the MS fails to detect a preamble. The fast-track method estimates whether the requested packet would have been properly decoded or whether the requested packet would have been in error in accordance with measured average SINR for the duration of the requested packet. Different embodiments of the method are described in detail in reference to FIGS. 4A and 4B. Because the PER probabilities $p_i$ are calculated/estimated over several past time slots; the values of $p_i$ do not accurately reflect current predicted SINR value. Therefore, in step 310, the PER probabilities $p_i$, are modified to reflect the current predicted SINR value. In accordance with one embodiment, the modification is carried out in accordance with the following equation:

$$p_i = p_i \cdot e^{-\beta(OL\_SINR_{Predicted\_CS} - OL\_SINR_{Predicted\_LT})}. \tag{2b}$$

In equation (2b), β represents a factor controlling an amount by which the probabilities $p_i$ should be modified. The β factor is advantageously determined from simulation. In the exemplary embodiment $OL\_SINR_{Predicted\_CS}$ is an SIINR predicted by the open loop from the current time slot, and $OL\_SINR_{Predicted\_LT}$ is an SINR predicted by the open loop based on past time slots. The open-loop method was discussed in reference to FIG. 1 Control flow then proceeds to step 312.

In step 312, probabilities $\alpha_i, \alpha_{i+1}$ of requesting data rates $R_i$, $R_{i+1}$ are calculated so that a throughput TH is maximized under the condition that a desired PER ($p_{target}$) is achieved. Mathematically, $\alpha_i, \alpha_{i+1}$ are selected so that the following equation is satisfied:

$$TH = \max(\alpha_i \cdot R_i \cdot (1-p'_i) + \alpha_i \cdot R_{i+1} \cdot (1-p'_{i+1})) \tag{3}$$

subject to the conditions:

$$\alpha_i p'_i + \alpha_{i+1} \cdot p'_{i+1} = p_{target}, \text{ and} \tag{4}$$

$$\alpha_i + \alpha_{i+1} = 1. \tag{5}$$

Control flow then proceeds to step 314.

In step 314, the values of probabilities $\alpha_i, \alpha_{i+1}$ are used as biases for making a decision, which of the rates $R_i$, $R_{i+1}$ is to be requested. Control flow then proceeds to step 316.

In step 316, the rate selected in step 314 is requested.

II. Adaptive Rate Selection Method Using Three Rates

In another embodiment, the method described in reference to FIG. 3 is extended to three data rates. Steps 300 through 306 are identical to those described in reference to FIG. 3.

In step 308, data rates $R_{i+1}$, $R_{i+2}$ at which a PER of packets received over a forward link will exceed the target PER are selected. The data rates $R_i$, $R_{i+1}$, $R_{i+2}$ satisfy the following equation:

$$R_i < R_{i+1} < R_{i+2} \tag{6}$$

In one embodiment, $R_{i+1}$ is a data rate, an SINR threshold for correct detection of which is higher than and adjacent to the predicted SINR for a given tail probability. In another embodiment, $R_{i+1}$ is a data rate, an SINR threshold for correct detection of which is higher than the predicted SINR for a given tail probability of error. In one embodiment, $R_{i+2}$ is a data rate higher than and adjacent to the data rate $R_{i+1}$. In another embodiment, $R_{i+2}$ is a data rate higher than the data rate $R_{i+1}$.

Step 310 is identical to step described in reference to FIG. 3.

In step 312, probabilities $\alpha_i, \alpha_{i+1}, \alpha_{i+2}$ of selecting rates $R_i$, $R_{i+1}$ are calculated so that a throughput estimates $TH_{i,i+1}$, $TH_{i,i+2}$ for a data rate combination $R_i$, $R_{i+1}$, and $R_i$, $R_{i+2}$ are maximized under the condition that $p_{target}$ is achieved. Mathematically, $\alpha_i, \alpha_{i+1}, \alpha_{i+2}$ are selected so that the following equations are satisfied:

$$TH_{i,i+1} = \max(\alpha_i \cdot R_i \cdot (1-p'_i) + \alpha_{i+1} \cdot R_{i+1} \cdot (1-p'_{i+1})) \tag{7}$$

$$TH_{i,i+2} = \max(\alpha_i \cdot (1-p'_i) \cdot R_i + \alpha_{i+2} \cdot R_{i+2} \cdot (1-p'_{i+2})) \tag{8}$$

which are solved subject to the conditions:

$$p'_i \cdot \alpha_i + p'_{i+1} \cdot \alpha_{i+1} = p_{target} \tag{9}$$

$$p'_i \cdot \alpha_i + p'_{i+2} \cdot \alpha_{i+2} = p_{target} \tag{10}$$

$$\alpha_i + \alpha_{i+1} = 1 \tag{11}$$

$$\alpha_i + \alpha_{i+2} = 1. \tag{12}$$

In step 314, the throughput estimates $TH_{i,i+1}$, $TH_{i,i+2}$ are compared. The values of probabilities of αs corresponding to the greater throughput estimate are used as biases for making a decision, which of the rates corresponding to the values of probabilities of αs is to be requested. Thus if $TH_{i,i+1}$ is greater than $TH_{i,i+2}$, the values of probabilities $\alpha_i, \alpha_{i+1}$ are used to make a decision whether $R_i$ or $R_{i+1}$ is to be requested.

Step 316 is identical to step described in reference to FIG. 3.

III. Adaptive Rate Selection Method Using N Rates

In another embodiment, the method described in reference to FIG. 3 is further extended to N rates.

Steps 300 through 306 are identical to those described in reference to FIG. 3.

In step 308, the remaining N-1 data rates are selected. In one embodiment, data rates $R_{i+j}$, $j \in (1, N-1)$ are the data rates at which a PER of packets received over a forward link will exceed the target PER. The data rates $R_{i+j}$ satisfy the following equation:

$$R_i < R_{i+1} < \ldots < R_{i+N-1} \quad (13)$$

In one embodiment, $R_{i+1}$ is a data rate, an SINR threshold for correct detection of which is higher than and adjacent to the predicted SINR for a given tail probability. In another embodiment, $R_{i+1}$ is a data rate, an SINR threshold for correct detection of which is higher than the predicted SINR for a given tail probability of error. In another embodiment, the data rates $R_{i+j}$ are adjacent to each other.

In another embodiment, data rates $R_{i+j}$, $j \in (1, N-1)$ are divided in two sets.

The first set contains data rates at which a PER of packets received over a forward link will not exceed the target PER. The data rates $R_{i+j}$, $j \in (-m, 0)$ satisfy the following equation:

$$R_{i-m} > \ldots > R_{i-1} > R_i \quad (14)$$

In one embodiment, the data rates $R_{i+j}$ are adjacent to each other.

The second set contains data rates at which a PER of packets received over a forward link will exceed the target PER. The data rates $R_{i+j}$, $j \in (1, N-m)$ satisfy the following equation:

$$R_i < R_{i+1} < \ldots < R_{i+N-m} \quad (15)$$

In one embodiment, $R_{i+1}$ is a data rate, an SINR threshold for correct detection of which is higher than and adjacent to the predicted SINR for a given tail probability. In another embodiment, $R_{i+1}$ is a data rate, an SINR threshold for correct detection of which is higher than the predicted SINR for a given tail probability of error. In another embodiment, the data rates $R_{i+j}$ are adjacent to each other.

Step 310 is identical to step described in reference to FIG. 3.

In step 312, probabilities $\alpha_i$ for all $i \in (1, N)$ of selecting rates $R_i$ for all $i \in (1, N)$ are calculated so that a throughput TH is maximized under the condition that $P_{target}$ is achieved. Mathematically, $\alpha_i$ are selected so that the following equations are satisfied:

$$TH = \max\left[\sum_{i=1}^{N} (\alpha_i \cdot R_i \cdot (1 - p'_i))\right] \quad (16)$$

when:

$$\sum_{i=1}^{N} \alpha_i \cdot p'_i = p_{target} \quad (17)$$

$$\sum_{i=1}^{N} \alpha_i = 1. \quad (18)$$

In step 314, the values of probabilities $\alpha_i$ for $i \in (1,N)$ are used as biases for making a decision, which of the rates for all $i \in (1,N)$ is to be requested.

In step 316, the rate selected in step 314 is requested.

Figure 4A:
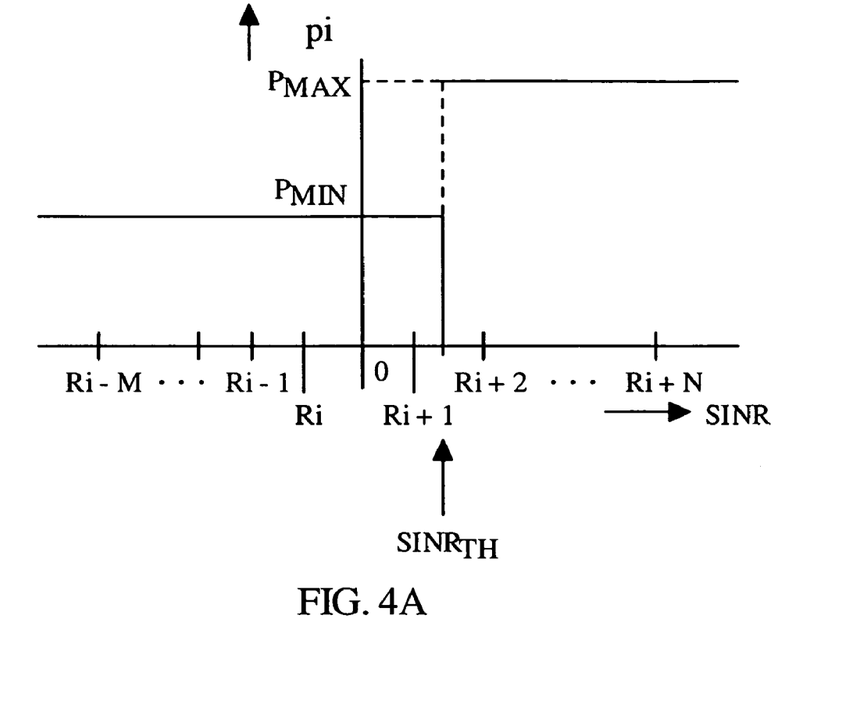
FIGS. 4A-4B illustrate methods for initial estimate of probabilities for a set of data rates.
Figure 4B:
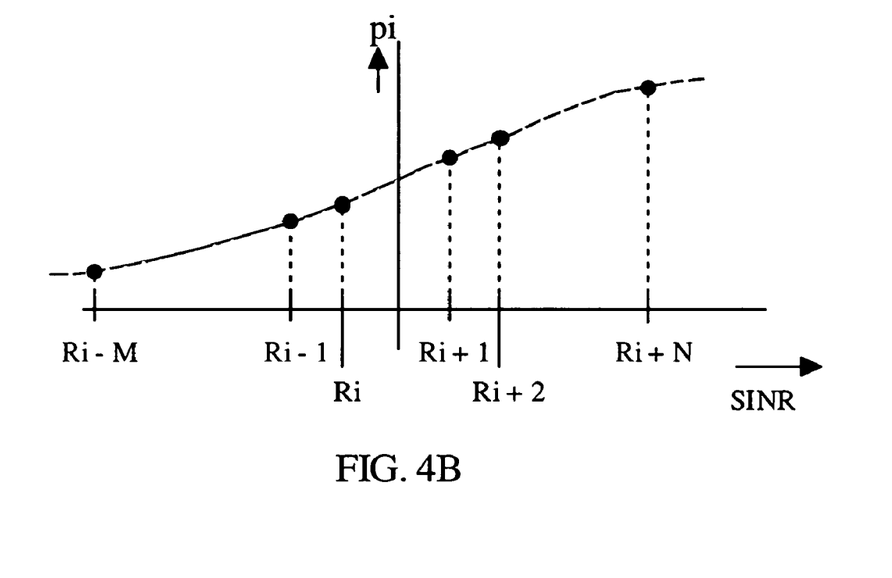

FIGS. 4a and 4b illustrate methods for initial estimate of probabilities $p_i$ for a set of data rates $R_i$, for all i. FIG. 4a depicts an embodiment in which all the probabilities $p_i$ for a set of data rates $R_i$ below a certain SINR ($SINR_{TH}$) are initialized to a first value, e.g., $p_{min}$, and all the probabilities $p_i$ for a set of data rates $R_i$ above the certain SINR are initialized to a second value, e.g., $p_{max}$. FIG. 4b depicts another embodiment, in which the relationship between an SINR and a probability that a packet will be received at a certain rate is established.

Figure 5A:
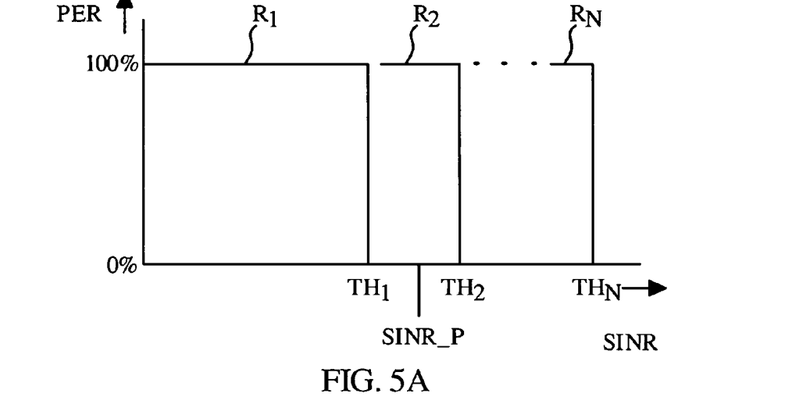
FIGS. 5A-5B depict a relationship between an SINR and a PER as used by the fast-track method.
Figure 5B:
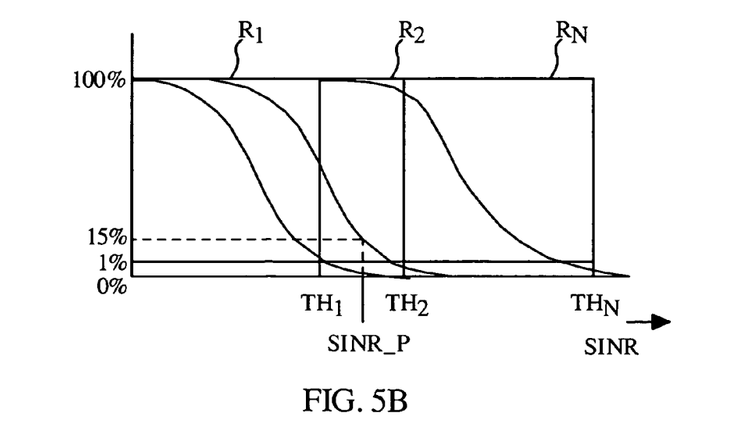

FIGS. 5a and 5b depict a relationship between an SINR and a PER as used by the fast-track method. FIG. 5A depicts a "brick-wall" approximation of the relationship. Consequently, a packet is declared to be in error, e.g., received with 100% PER, if the average SINR measured over the packet duration is less than the SINR threshold required for the rate selected. The packet is declared to be correctly received if the average SINR is greater than an SINR threshold required for the rate selected.

The SINR thresholds required for each rate are advantageously chosen based on an average white gaussian noise (AWGN) channel model to represent a minimum SINR required to decode a packet at each data rate with 1% PER. Consider a packet received with SINR_P. If the requested rate were $R_1$, the packet would be declared correctly received because the SINR_P is greater than the SINR threshold ($TH_1$) for rate $R_1$. If the requested rate were $R_2$, the packet would be declared in error because the SINR_P is less than the SINR threshold ($TH_2$) for rate $R_2$.

However, as FIG. 5B shows, the embodiment distorts the probabilities $p_i$ because certain requested packets characterized as correctly received by virtue of the approximation would in fact be received in error and vice versa. FIG. 5B shows the measured relationship between an SINR and a PER at different rates, $R_1, R_2, \ldots R_N$, superimposed on a "brick-wall" approximation. Consider packet received with SINR_P. Using the "brick-wall" approximation, if the requested rate were $R_2$, the packet would be declared in error because the SINR_P is less than the $TH_2$. However, the measured relationship shows a PER of only 15%. As the SINR_P moves toward $TH_2$, the PER further decreases.

Therefore, in another embodiment, the relationship between an SINR and a PER at a certain rate is established. The fast-track method then uses the established relationship to associate the measured average SINR with the PER. The PER is then used to calculate the probabilities $p_i$.

Figure 6:
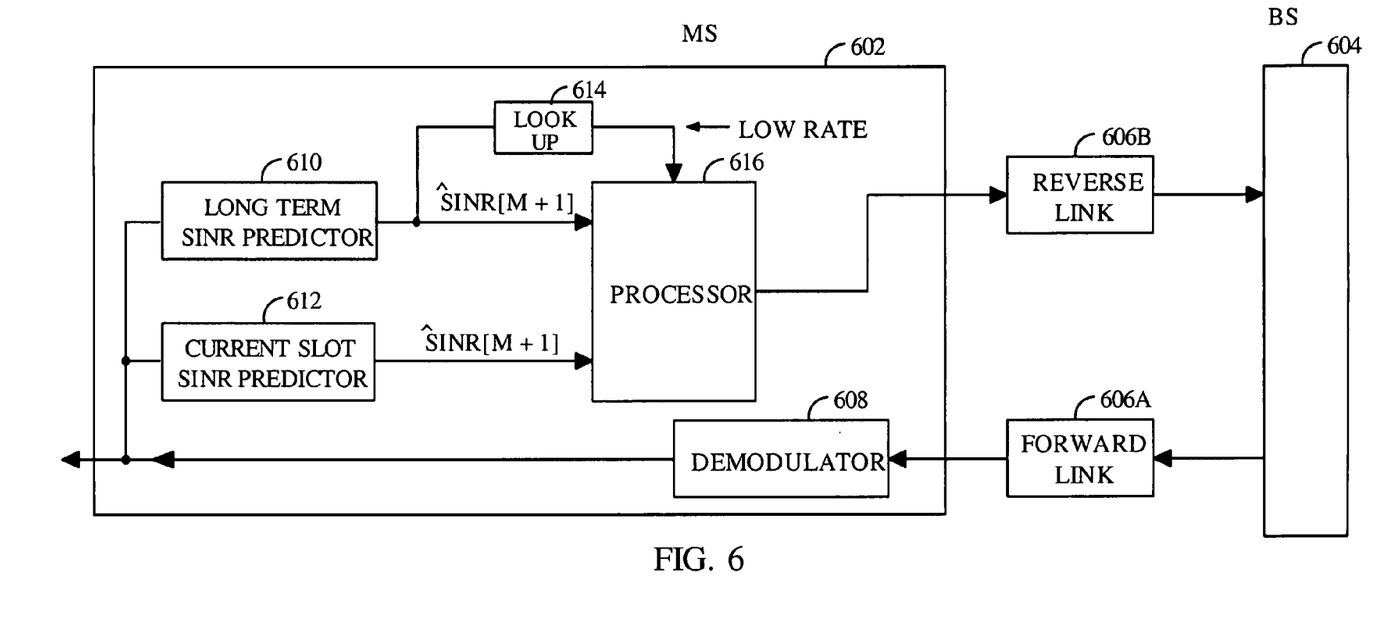
FIG. 6 is a detailed block diagram of an exemplary communication system capable of implementing embodiments of the invention.

FIG. 6 is a detailed block diagram of an exemplary communication system wherein an MS 602 contains an apparatus for an adaptive rate selection method in accordance with one embodiment of the present invention.

A signal arriving at the MS 602 from the BS 604 over the forward link 606a in packets is provided to a demodulator 608. The demodulator 608 measures an average SINR over the duration of each packet, and provides the average SINRs to a long-term SINR predictor 610. The long-term SINR predictor 610 predicts an SINR value of the next packet ($OL\_SINR_{Predicted\_LT}$). In one embodiment, the predictor 610 predicts the value $OL\_SINR_{Predicted\_LT}$ of the next packet in accordance with the open-loop method discussed in reference to FIG. 1. However, one skilled in the art will understand that any open-loop method, not limited to the one discussed in reference to FIG. 1, may be used. The $OL\_SNIR_{Predicted\_LT}$ value is provided to a processor 616 and to a look up table 614. The look up table 614 maintains a set of SIR thresholds that represent the minimum SINR required to successfully decode a packet at each data rate. The processor 616 consults the look up table 614 to select a data rate $R_i$ at which a PER of packets received from over a forward link will not exceed the target PER is selected. In one embodiment, $R_i$ is a data rate, an SINR threshold for correct detection of which is lower and adjacent to a predicted SINR for a given tail probability of error. In another embodiment, $R_i$ is a data rate, an SINR threshold for correct detection of which is lower than the predicted SINR for a given tail probability of error.

The processor 616 further selects a data rate $R_{i+1}$ at which a PER of packets received from over a forward link will exceed the target PER. In one embodiment, $R_{i+1}$ is a data rate, an SINR threshold for correct detection of which is higher and adjacent to the predicted SINR for a given tail probability. In another embodiment, $R_{i+1}$ is a data rate, an SINR threshold for correct detection of which is higher than the predicted SINR for a given tail probability of error.

The demodulator 608 also measures an average SINR over the duration of a current time slot, and provides the average SINRs to a current-slot SINR predictor 612. The current-slot SINR predictor 612 predicts an SINR value of the next packet ($OL\_SINR_{Predicted\_CS}$) In one embodiment, the predictor 612 predicts the value $OL\_SNIR_{Predicted\_CS}$ of the next packet in accordance with the open-loop method discussed in reference to FIG. 1. However, one skilled in the art will understand that any open-loop method, not limited to the one discussed in reference to FIG. 1, may be used. The $OL\_SNIR_{Predicted\_CS}$ value is provided to the processor 616.

The processor 616 then performs operations described in steps 310 through 316 with reference to FIG. 3.

One skilled in the art will appreciate that the principles extending the two-rate method to three and N rates, as disclosed in reference to FIG. 3, are equally applicable.

Although the demodulator 608, the long-term predictor 610, the current-slot predictor 612, the look-up table 614, and the processor 616 are shown as separate elements, one skilled in the art will appreciate that the physical distinction is made for explanatory purposes only. The demodulator 608, the long-term predictor 610, the current-slot predictor 612, and the processor 616 may be incorporated into a single processor accomplishing the above-mentioned processing. Thus, the processor may be, e.g., a general-purpose processor, a digital signal processor, a programmable logic array, and other devices known to one skilled in the art. Furthermore, the look up table 614 is a space in a memory. The memory may be a part of the above-mentioned processor or processors, or be a separate element. The implementation of the memory is a design choice. Thus, the memory can be any medium capable of storing information, e.g., a magnetic disk, a semiconductor integrated circuit, and other storage media known to one skilled in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A computer-readable storage medium comprising instructions which, when executed by a processor, cause the processor to perform operations comprising:
    selecting a target packet error rate;
    predicting a first data rate a packet error rate of which is smaller than said target packet error rate, comprising:
    selecting a target tail probability of error;
    determining a first quality metric corresponding to said target tail probability; and
    selecting said first data rate a quality metric of which is smaller than said first quality metric;
    predicting a second data rate a packet error rate of which is greater than said target packet error rate;
    predicting a third data rate a packet error rate of which is. greater than said target packet error rate; and
    requesting said first data rate or said second data rate or said third data rate to achieve said target packet error rate.

2. The computer-readable storage medium of claim 1, wherein said quality metric of said first data rate is further adjacent to said first quality metric.

3. A computer-readable storage medium comprising instructions which, when executed by a processor, cause the processor to perform operations comprising:
    selecting a target packet error rate;
    predicting a first data rate a packet error rate of which is smaller than said target packet error rate;
    predicting a second data rate a packet error rate of which is greater than said target packet error rate, comprising:
    selecting a target tail probability of error;
    determining a first quality metric corresponding. to said target tail probability; and
    selecting said second data rate a quality metric of which is greater than said first quality metric;
    predicting a third data rate, a packet error rate of which is greater than said target packet error rate; and
    requesting said first data rate or said second data rate or said third data rate to achieve said target packet error rate.

4. The computer-readable storage medium of claim 3, wherein said quality metric of said second data rate is further adjacent to said first quality metric.

5. A computer-readable storage medium comprising instructions which, when executed by a processor, cause the processor to perform operations comprising:
    selecting a target packet error rate;
    predicting a first data rate a packet error rate of which is smaller than said target packet error rate;
    predicting a second data rate a packet error rate of which is greater than said target packet error rate;
    predicting a third data rate a packet error rate of which is greater than said target packet error rate, comprising:
    selecting a target tail probability of error;
    determining a first quality metric corresponding to said target tail probability; and
    selecting said third data rate a quality metric of which is greater than said first quality metric, and said third data rate is greater than said second data rate; and
    requesting said first data rate or said second data rate or said third data rate to achieve said target packet error rate.

6. The computer-readable storage medium of claim 5, wherein said third data rate is further adjacent to said second quality metric.

7. A computer-readable storage medium comprising instructions which, when executed by a processor, cause the processor to perform operations comprising:
- selecting a target packet error rate;
- predicting a first data rate a packet error rate of which is smaller than said target packet error rate;
- predicting a second data rate a packet error rate of which is greater than said target packet error rate;
- predicting a third data rate a packet error rate of which is greater than said target packet error rate; and
- requesting said first data rate or said second data rate or said third data rate to achieve said target packet error rate, comprising:
- determining a first packet error rate probability for a first data rate;
- determining a second packet error rate probability for a second data rate;
- determining a third packet error rate probability for a third data rate; and
- determining said first data rate or said second data rate or said third data rate in accordance with said first packet error rate probability, said second packet error rate probability, and said third packet error rate probability.

8. The computer-readable storage medium of claim 7, wherein the method further comprises:
- modifying said first packet error rate probability in accordance with a current predicted signal quality metric;
- modifying said second packet error rate probability in accordance with said current predicted signal quality metric; and
- modifying said third packet error rate probability in accordance with a current predicted signal quality metric.

9. The computer-readable storage medium of claim 7, wherein said determining of a first packet error rate probability, a second packet error rate probability, and a third packet error rate probability is carried out in accordance with a true packet event.

10. The computer-readable storage medium of claim 7, wherein said determining of a first packet error rate probability, a second packet error rate probability, and a third packet error rate probability is carried out in accordance with a fast-track method.

11. The computer-readable storage medium of claim 7, wherein said determining of said first data rate or said second data rate or said third data rate comprises:
- calculating a first probability of selecting said first data rate and a second probability of selecting said second data rate so that a first throughput of said communication system is maximized and said target packet error rate is achieved;
- calculating a third probability of selecting said first data rate and a fourth probability of selecting said third data rate so that a second throughput of said communication system is maximized and said target packet error rate is achieved;
- selecting said first data rate or said second data rate in accordance with said first probability and said second probability when said first throughput is greater than said second throughput; and
- selecting said first data rate or said third data rate in accordance with said third probability and said fourth probability when said first throughput is smaller than said second throughput.

12. A computer-readable storage medium comprising instructions which, when executed by a processor, cause the processor to perform operations comprising:
- selecting a target packet error rate;
- predicting a first set of data rates a packet error rate of which is smaller than said target packet error rate, comprising:
- selecting a target tail probability of error;
- determining a first quality metric corresponding to said target tail probability; and
- selecting said first set of data rates a quality metric of which is smaller than said first quality metric;
- predicting a second set of data rates, a packet error rate of which is greater than said target packet error rate; and
- requesting a first data rate from said first set or a second data rate from said second set to achieve said target packet error rate.

13. A computer-readable storage medium comprising instructions which, when executed by a processor; cause the processor to perform operations comprising:
- selecting a target packet error rate;
- predicting a first set of data rates a packet error rate of which is smaller than said target packet error rate;
- predicting a second set of data rates a packet error rate of which is greater than said target packet error rate, comprising:
- selecting a target tail probability of error;
- determining a first quality metric corresponding to said target tail probability; and
- selecting said second set of data rates a quality metric of which is greater than said first quality metric; and
- requesting a first data rate from said first set or a second data rate from said second set to achieve said target packet error rate.

14. A computer-readable storage medium comprising instructions which, when executed by a processor, cause the processor to perform operations comprising:
- selecting a target packet error rate;
- predicting a first set of data rates a packet error rate of which is smaller than said target packet error rate;
- predicting a second set of data rates a packet error rate of which is greater than said target packet error rate; and
- requesting a first data rate from said first set or a second data rate from said second set to achieve said target packet error rate, comprising:
- determining a packet error rate probability for each data rate; and
- determining said first data rate from said first set or said second data rate from said second set in accordance with said packet error rate probabilities.

15. The computer-readable storage medium of claim 14, wherein the method further comprises modifying said packet error rate probabilities in accordance with a current predicted signal quality metric.

16. The computer-readable storage medium of claim 14, wherein said determining of said packet error rate probabilities is carried out in accordance with a true packet event.

17. The computer-readable storage medium of claim 14, wherein said determining of said packet error rate probabilities is carried out in accordance with a fast-track method.

18. The computer-readable storage medium of claim 14, wherein said determining of said first data rate or said second data rate comprises:
- calculating a probability of selecting each of said data rates so that a throughput of said communication system is maximized and said target packet error rate is achieved; and
- selecting said first data rate or said second data rate in accordance with said probabilities.

* * * * *